US012752135B2

(12) United States Patent
Zhang

(10) Patent No.: US 12,752,135 B2
(45) Date of Patent: Oct. 6, 2026

(54) FIRE EMERGENCY SELF-RESCUE DEVICE

(71) Applicant: Li Zhang, Dazhou (CN)

(72) Inventor: Li Zhang, Dazhou (CN)

( * ) Notice: Subject to any disclaimer, the term of this patent is extended or adjusted under 35 U.S.C. 154(b) by 196 days.

(21) Appl. No.: 18/775,099

(22) Filed: Jul. 17, 2024

(65) Prior Publication Data

US 2026/0021329 A1 Jan. 22, 2026

(51) Int. Cl.
*A62C 2/10* (2006.01)
*A62B 5/00* (2006.01)

(52) U.S. Cl.
CPC .................................... *A62B 5/00* (2013.01)

(58) Field of Classification Search
CPC .... A62B 5/00; A62B 3/00; A62C 2/06; A62C 2/08; A62C 2/10; A62C 3/0264
See application file for complete search history.

(56) References Cited

U.S. PATENT DOCUMENTS

2004/0159448 A1* 8/2004 Robinson, Jr. ........... A62C 2/10
169/48

FOREIGN PATENT DOCUMENTS

| | | | | |
|---|---|---|---|---|
| CN | 111529990 A | * | 8/2020 | ............. A62B 31/00 |
| CN | 107158601 B | * | 9/2022 | ............. A62C 31/28 |
| DE | 202020105729 U1 | * | 10/2020 | ................ F16L 5/04 |
| KR | 20110102566 A | * | 9/2011 | ............... A62C 2/06 |

* cited by examiner

*Primary Examiner* — Steven M Sutherland
(74) *Attorney, Agent, or Firm* — Birchwood IP

(57) ABSTRACT

A fire emergency self-rescue device is provided, which is provided with a storage compartment and a soft barrier curtain. The storage compartment is a frame structure with an opening facing downward, a top of the storage compartment is provided on a ceiling of a bathroom. The barrier curtain is provided in the storage compartment, an upper of the barrier curtain is fixed on an inner side of a top of the storage compartment and can be suspended from top to bottom to the ground. The barrier curtain is a double-layer structure, a top of an interior of the storage compartment is provided with a water spraying part. A water intake pipe of the water spraying part is connected to an indoor water supply system. Inner and outer layers of the barrier curtain are respectively provided on inner and outer sides of the water spraying part.

10 Claims, 10 Drawing Sheets

FIRE EMERGENCY SELF-RESCUE DEVICE

TECHNICAL FIELD

The present disclosure relates to the field of fire protection equipment technologies, and in particular, to a fire emergency self-rescue device.

BACKGROUND

At present, as number of high-rise buildings is generally increasing, the difficult rescue for fire department is increased accordingly. Before the rescue of the fire department arrives, a self-rescue of trapped personnel in high-rise buildings becomes increasingly important, which is the key to further reducing fire casualties. At present, the main sources of harm to trapped individuals are concentrated in two aspects: high temperature injuries and harmful gas injuries.

At present, there are fire self-rescue devices on the market, most of which are fire escape devices. The fire escape devices are mostly folding elevators, which are installed on balcony guardrails or window anti-theft nets. In the event of fire, the folding elevators are unfolded and used to escape to other residents downstairs, in order to escape the danger of the fire. Or a descent rope can be used to escape from the fire scene. However, in high-rise buildings, both of these escape methods pose great danger to evacuees. During an escape process, it is easy for ropes to break or escape personnel to make operational mistakes, resulting in the risk of falling. Furthermore, it is not easy to build elevators and escape ropes on floors above 50 meters.

According to statistics, timely rescue by firefighters is the most likely and safest way to be rescued.

Therefore, a self-rescue device is needed, which can extend the protection time of trapped personnel in the event of fire, in order to wait for timely rescue by firefighters. The self-rescue device can maintain a suitable temperature in the protective device in a high-temperature environment, while preventing toxic smoke from entering the curtain as much as possible and ensuring the safety of the air inside the curtain.

SUMMARY

The purpose of the present disclosure is to solve the above defects and provide a fire emergency self-rescue device. Through a double-layer structure of a barrier curtain and a bidirectional water spraying design of a water spraying part, it can achieve double-layer water addition and cooling of the barrier curtain, ensuring that an interior of the barrier curtain is not affected by external high temperature. And the humidified barrier curtain can further adsorb and filter toxic gases, ensuring the safety of internal personnel.

The purpose of the present disclosure is achieved by the following.

A fire emergency self-rescue device, which is provided with a storage compartment and a soft barrier curtain; the storage compartment is a frame structure with an opening facing downward; a top of the storage compartment is provided on a ceiling of a bathroom, and the barrier curtain is provided in the storage compartment; an upper of the barrier curtain is fixed on an inner side of a top of the frame structure of the storage compartment and is capable of being suspended from top to bottom to the ground; the barrier curtain is a double-layer structure; a top of an interior the storage compartment is provided with a water spraying part; a water intake pipe of the water spraying part is connected to an indoor water supply system; inner and outer layers of the barrier curtain are respectively provided on inner and outer sides of the water spraying part, and the water spraying part is capable of spraying on the inner and outer sides of the barrier curtain so as to humidify and cool the barrier curtain. In general, in the event of fire, the bathroom serves as an independent space with sufficient water supply, thus it is suitable to be served as an emergency shelter. However, when an open flame enters, it is still difficult to avoid accidents. Therefore, providing with a fire emergency self-rescue device in the bathroom is the most effective way. Through the design of a double-layer barrier curtain, the escapee is located in a middle of the inner layer, and a water spraying part is provided between the two layers. In emergency situations, the water spraying part sprays water on both the inner and outer layers of the barrier curtain simultaneously. Even in the event of a high-temperature open flame, because it continuously keeps the barrier curtain moist, with the continuous evaporation and cooling of water, the outer layer of the barrier curtain can always be kept in good condition without burning or damage. At the same time, due to the evaporation of water from the outer layer, the high-temperature evaporated water vapor will diverge along two surfaces of the outer layer, taking away a large amount of heat, thereby preventing the outer layer from being damaged by high temperature and losing its function. In addition, due to the evaporation of water vapor, heat will continue to diffuse towards the inner layer, and the space between the two layers of the barrier curtain will maintain a continuous spray of water flow, cooling the air between the two layers, thereby blocking the continuous spread of heat towards the inner layer and maintaining the low-temperature state of the inner layer barrier curtain, so that refugees will not be harmed in the low-temperature environment inside. At the same time, due to the moisture and wet barrier curtain, when particles or polluted air pass through the wet barrier curtain, they will adsorb relevant particles, thereby achieving simple filtration of toxic air (similar to an effect of wet towels covering the mouth and nose). Therefore, refugees not only do not suffer from high temperatures, but also avoid the harm of toxic gases caused by fires, keeping them in a safe state and extending their protection time so as to wait for the rescue of firefighters.

In an embodiment of the present disclosure, the storage compartment includes a top plate and a surrounding edge, the top plate is fixed to the ceiling by a screw, the surrounding edge is provided around an inner side of the top plate, and the surrounding edge is fixedly connected to the top plate so as to form a frame structure. The entire device is installed at the top of the bathroom in a top fixed manner, which is convenient for installation, maintains aesthetics, and does not take up space. Combined with a hanging barrier curtain, the barrier curtain is suspended in the storage compartment, achieving functions of fixation, suspension, storage, and protection.

In an embodiment of the present disclosure, the water spraying part is a hollow pipeline structure with a plurality of water spraying holes on two horizontal sides of the pipeline so as to humidify and cool the barrier curtain. By adopting this pipeline design and setting spraying holes on both sides, it achieves the purpose of moisturizing and cooling the inner and outer layers of the barrier curtain simultaneously, isolating high-temperature open flames and humid air, and filtering toxic gases.

In an embodiment of the present disclosure, the water spraying part is a square pipeline structure.

In an embodiment of the present disclosure, the water spraying part is a circular pipeline structure.

In an embodiment of the present disclosure, a position of the opening of the storage compartment is provided with two sliding doors that are capable of being opened opposite to each other so as to store the barrier curtain.

In an embodiment of the present disclosure, inner and outer sides of the water spraying part are respectively provided with an inner installation strip and an outer installation strip, both of which are configured to fix the inner and outer layers of the barrier curtain on the water spraying part.

In an embodiment of the present disclosure, an upper of the water spraying part is further provided with a layer of ceramic fiber cloth having a thickness of 10-20 mm; the outer layer is a high silica cloth with a thickness of 0.6-1.2 mm, and the inner layer is a high silica cloth coated with a silicone adhesive layer with a thickness of 0.4-1.3 mm.

In an embodiment of the present disclosure, a locking mechanism is provided at a corresponding position of each sliding door so as to lock the two sliding doors and prevent the barrier curtain from falling naturally; a pull handle is provided on each sliding door in a downward direction so as to open the two sliding doors and cause the barrier curtain to fall; the water intake pipe is connected to the indoor water supply system through a valve.

The beneficial effect of the present disclosure is that by providing with a double-layer barrier curtain, a water spraying part is provided between the two layers of barrier curtain. The water spraying part can spray water on the inner and outer layers of the barrier curtain, which is used for humidification and cooling the barrier curtain. As a result, it blocks the continuous spread of heat towards the inner layer, maintaining a low-temperature state of the inner barrier curtain, and keeping refugees in a low-temperature environment inside without being harmed. At the same time, due to the moisture and wet barrier curtains, toxic air is simply filtered, keeping refugees in a safe state and extending protection time so as to wait for the rescue of firefighters.

Numeral reference: 1—storage compartment, 101—water spraying part, 1011—blowhole, 102—top plate, 103—surrounding edge, 104—fixed groove, 106—water intake pipe, 107—heat insulation cotton, 2—barrier curtain, 201—inner layer, 202—outer layer, 203—isolation room, 204—fire avoidance area, 205—outer installation strip, 206—inner installation strip, 3—water supply pipe, 4—sliding door, 401—magnet, 402—pull handle, 403—solenoid valve, 404—sensor.

DESCRIPTION OF EMBODIMENTS

Below, a further detailed description of the present disclosure will be provided in combination with the accompanying drawings and specific embodiment.

Figure 1:
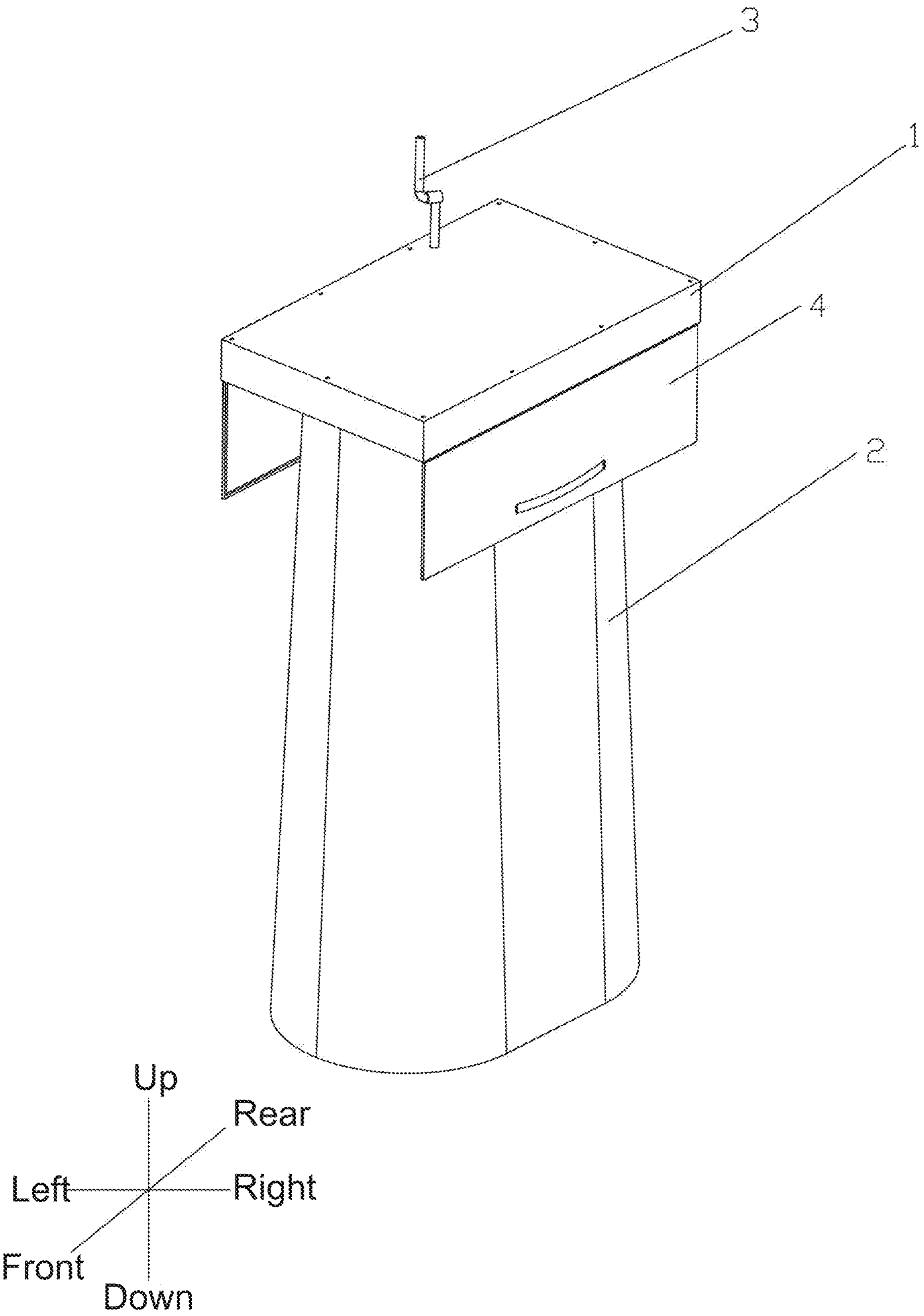
FIG. 1 is a three-dimensional structural schematic diagram of Embodiment 1 of the present disclosure.
Figure 2:
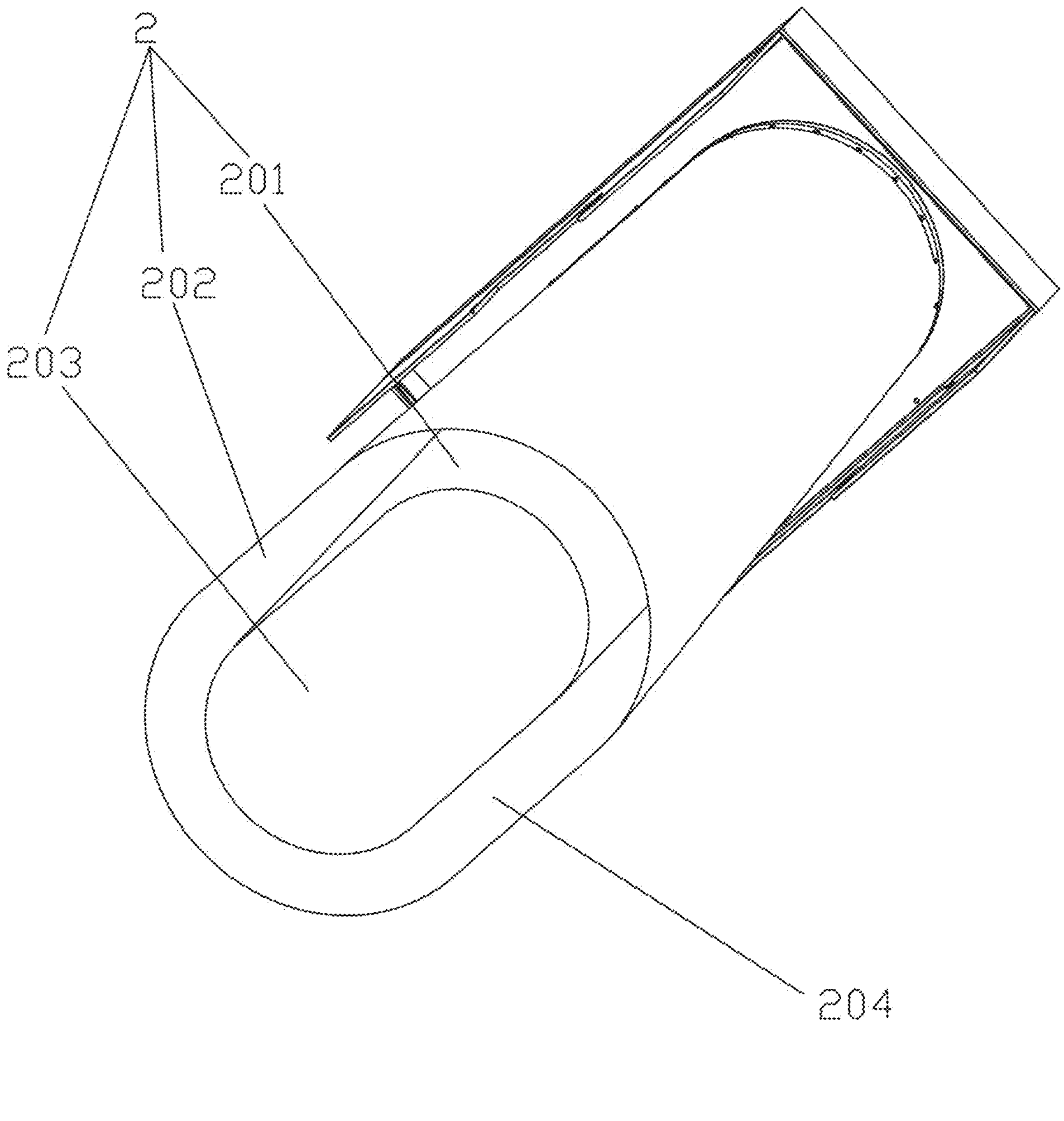
FIG. 2 is a three-dimensional structural schematic diagram in a bottom view of Embodiment 1 of the present disclosure.

Embodiment 1, please refer to FIGS. 1 to 2, a fire emergency self-rescue device, including a storage compartment 1 and a barrier curtain 2. The storage compartment 1 is a rectangular frame structure with an opening facing downward. The storage compartment 1 is fixed on a ceiling as a whole and is divided into an inner layer 201 and an outer layer 202. The outer layer 202 is a high silicon oxygen cloth with a thickness of 0.6-1.0 mm, and the inner layer 201 is a high silicon oxygen cloth coated with a silicon adhesive layer with a thickness of 0.36-1.35 mm. A top of the two-layer barrier curtain 2 is fixedly connected to a top surface of an interior of the storage compartment 1, as both are soft fabrics, they are usually stored in the storage compartment 1. When needed, the opening that faces downward of the storage compartment 1 is opened, and the barrier curtain 2 will unfold downwards from the opening of the storage compartment 1.

Figure 3:
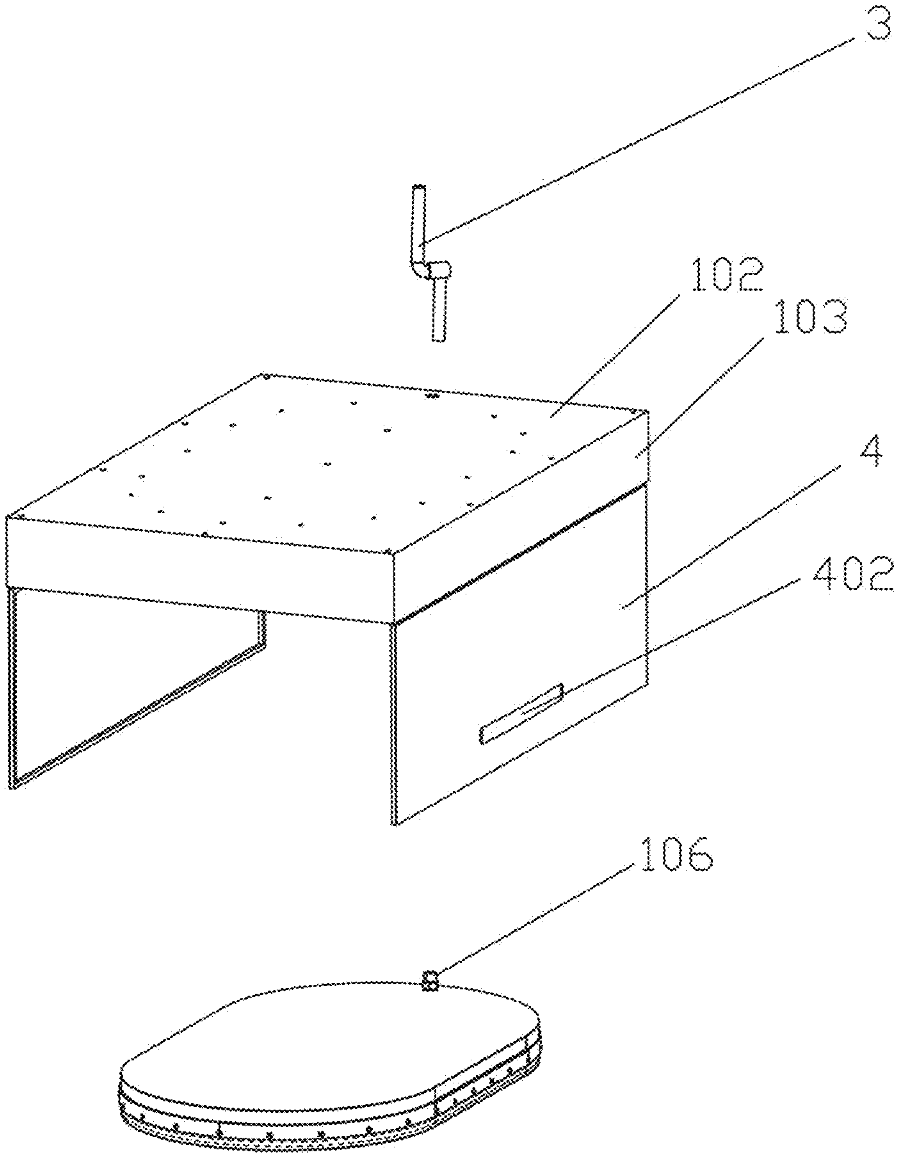
FIG. 3 is a schematic diagram of a decomposition structure of a storage compartment in Embodiment 1 of the present disclosure.
Figure 4:
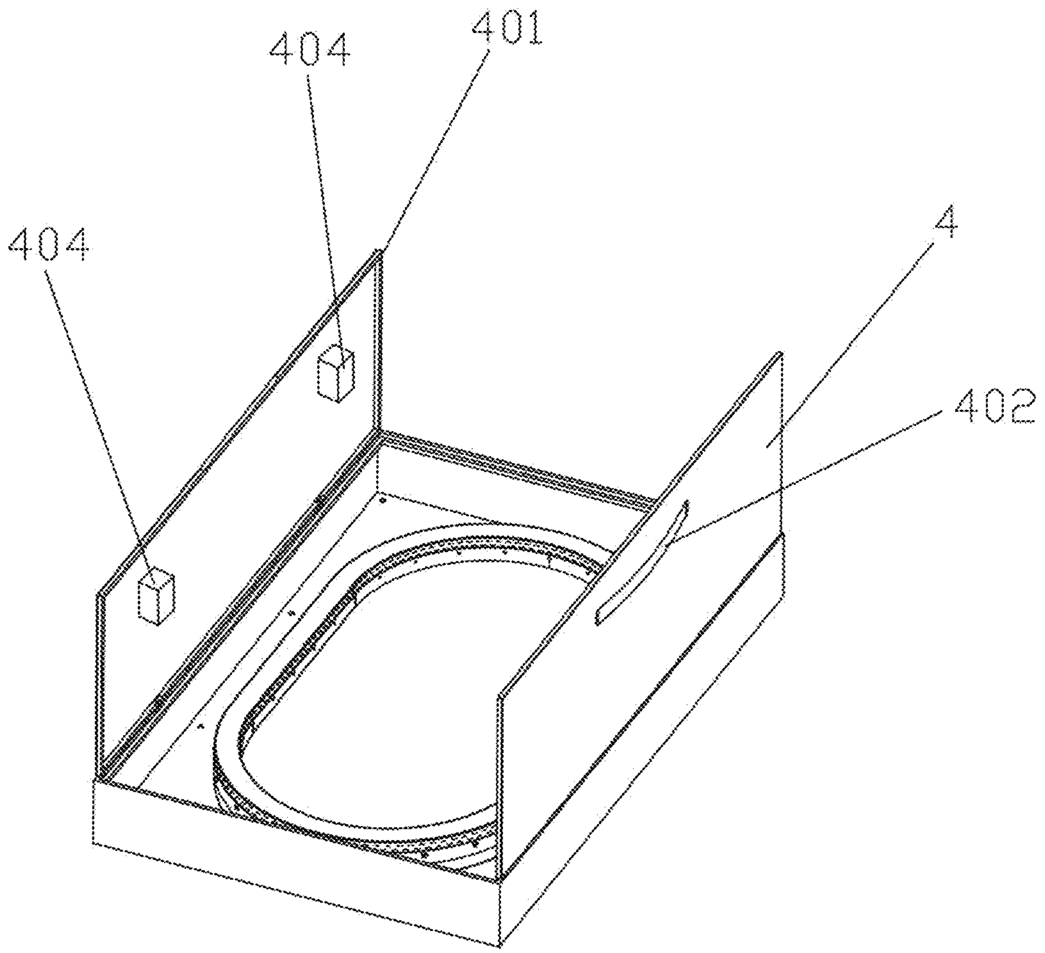
FIG. 4 is a three-dimensional structural schematic diagram in a bottom view of the storage compartment in Embodiment 1 of the present disclosure.

Please refer to FIGS. 3 to 4, the storage compartment 1 is composed of a top plate 102 and a surrounding edge 103. The surrounding edge 103 is provided around the top plate 102 and is fixedly connected to the top plate 102 by a screw so as to form a frame like structure as a whole. It can also be fixed and connected by welding and other methods. On the top plate 102, there are 2-3 through holes for threading the screw to securely connect the top plate 102 to the ceiling. A position of the opening of the storage compartment 1 is provided with two sliding doors 4 that are oppositely provided. Each sliding door 4 is provided with a pull handle 402, which allows a user to open the sliding doors. A magnet 401 is fixedly connected to an inner edge of each sliding door 4. When the sliding doors 4 are closed, it is locked by the suction of the magnet 401, and the magnet 401 forms a locking mechanism to prevent it from falling out. The sliding doors 4 can also be fixed directly by a buckle or door bolt. On an inner side of each sliding door 4, a sensor 404 is further provided to sense whether the sliding doors 4 are opened.

An inner side of the top plate 102 of the storage compartment 1 (referring to FIGS. 3-5) is fixedly provided with a water spraying part 101. The water spraying part 101 is a runway shaped structure with straight edges on both sides. A center of the water spraying part 101 is provided with a cavity, and an inner ring size of the cavity is slightly larger than an enclosed size of the inner layer 201 of the barrier curtain 2. A top of an interior of the storage compartment 1 and a position corresponding to the water spraying part 101 are provided with a fixed groove 104 that has the same shape as the water spraying part 101. The fixed groove 104 is fixedly connected to the top plate 102, and an inner ring size of the fixed groove 104 is slightly larger than an outer ring size of the water spraying part 101. The water spraying part 101 is placed in the fixed groove 104, and inner and outer sides of the straight edge of the fixed groove 104 are respectively an inner installation strip 206 and an outer installation strip 205. A through hole is respectively provided on the inner installation strip 206 and the outer installation strip 205, which are configured for the screw to pass through. The screw passes through the trough-hole toward a direction of the water spraying part 101. The screws on both sides of the straight edge apply force to the water spraying part 101 to compress the straight edges on both sides of the water spraying part 101 so as to be clamped on the straight edge of the fixed groove 104, and the water spraying part 101 as a whole is fixed in the fixed groove 104 so as avoid the water spraying part 101 from detaching from the storage compartment 1.

A heat insulation cotton 107 is provided between the fixed groove 104 and the water spraying part 101. The heat insulation cotton 107 is made of ceramic fiber cloth with a thickness of 10-20 mm, which has high temperature resistance and insulation function. The purpose of this design is to block the high temperature caused by fire and prevent the high temperature from being transmitted downwards by the water flow sprayed out by the water spraying part 101.

Figure 5:
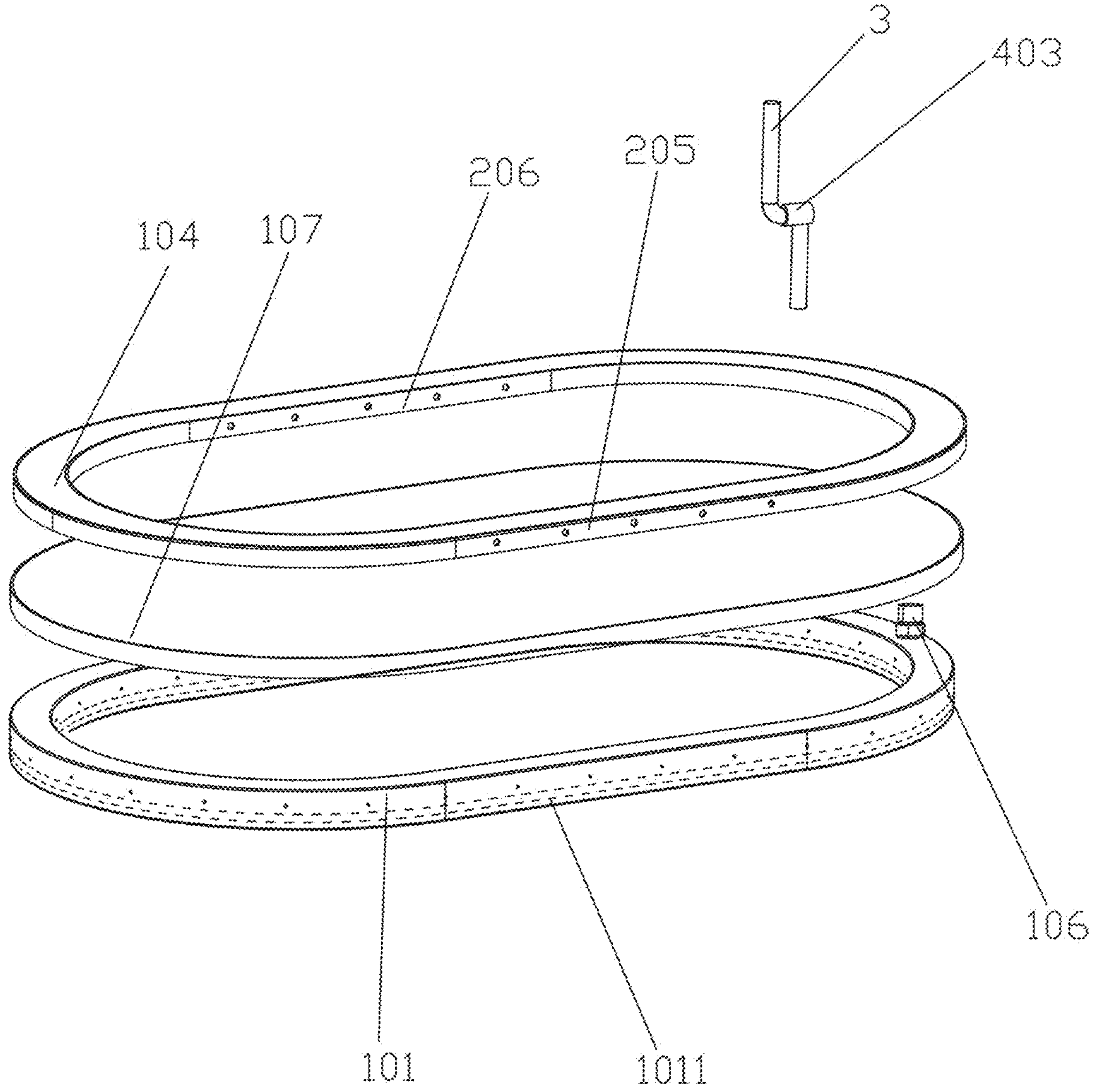
FIG. 5 is a three-dimensional schematic diagram of a decomposition structure of a water spraying part and a water supply pipe in Embodiment 1 of the present disclosure.
Figure 6:
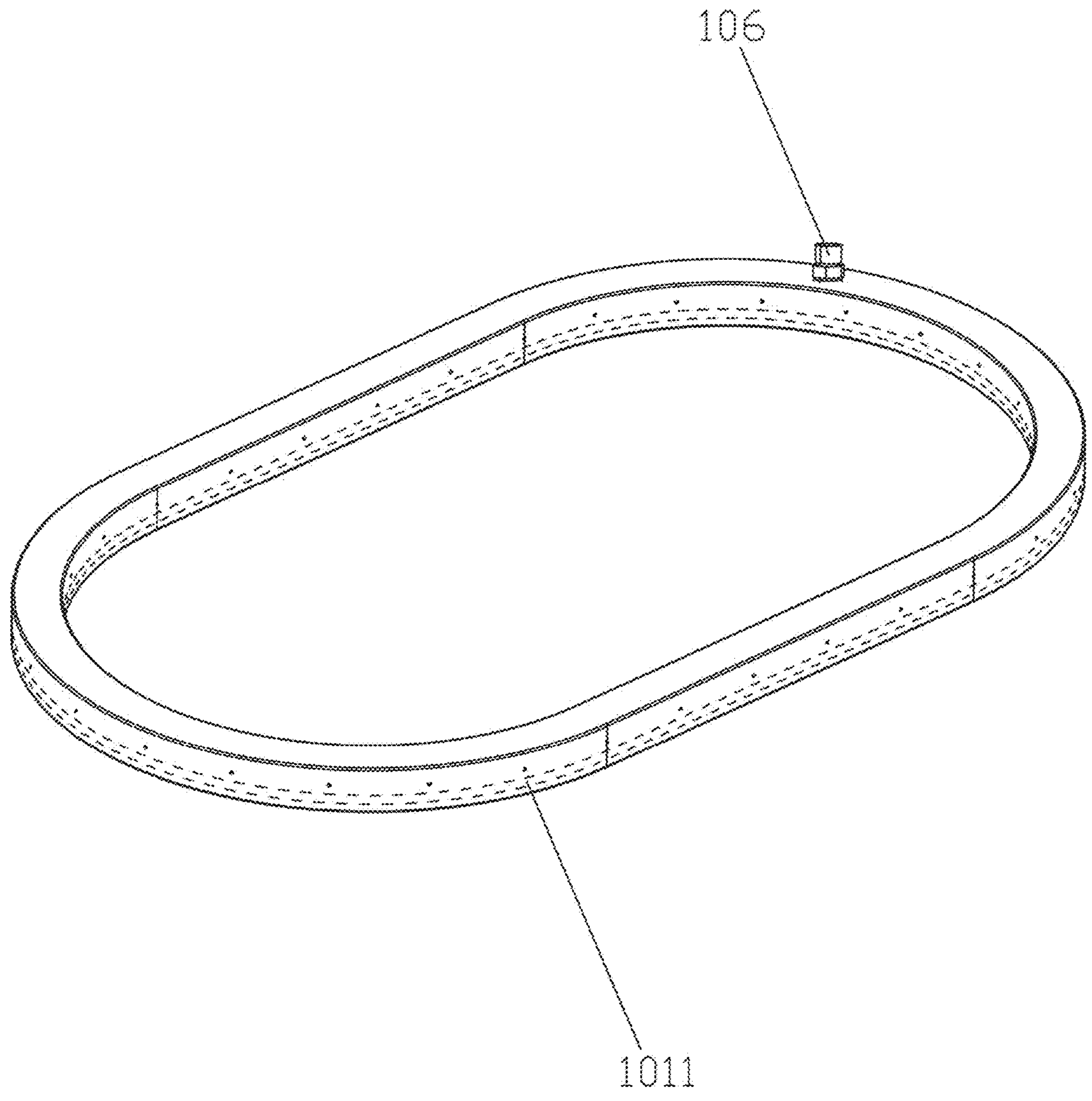
FIG. 6 is a structural schematic diagram of the water spraying part in Embodiment 1 of the present disclosure.
Figure 7:
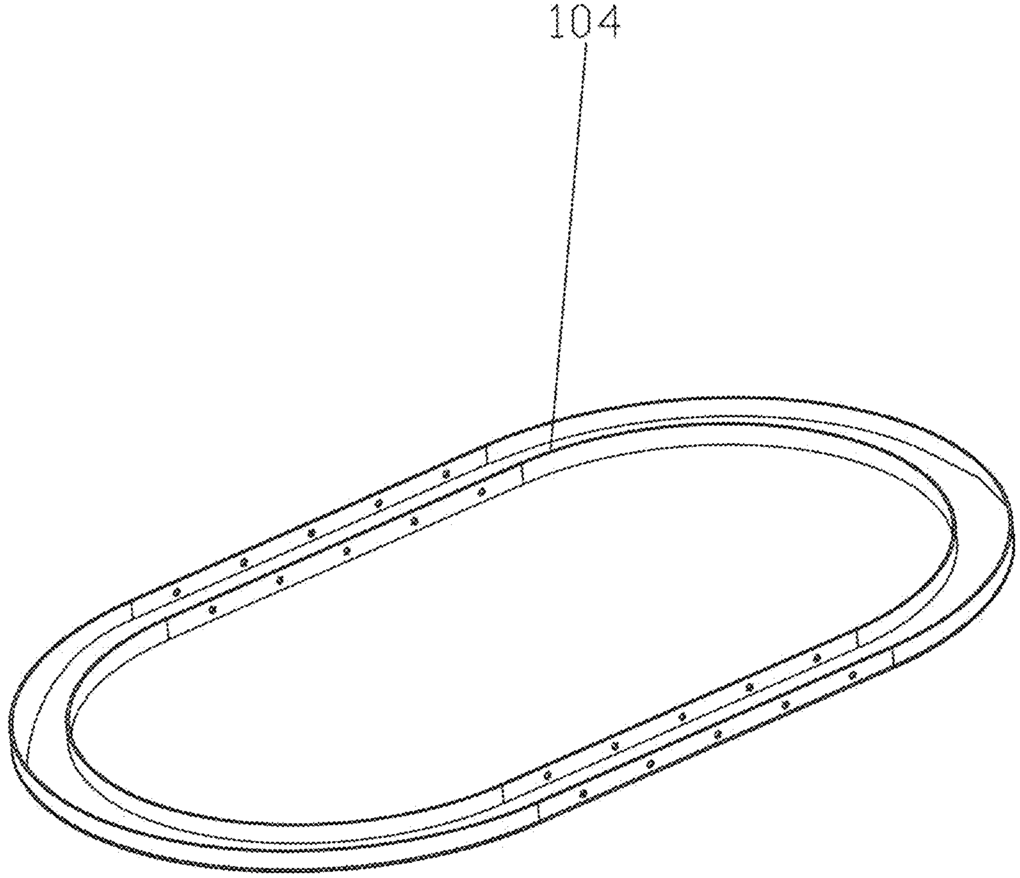
FIG. 7 is a structural schematic diagram of a fixed groove in Embodiment 1 of the present disclosure.

Please refer to FIGS. 3 to 5, on the top plate 102 of the storage compartment 1, there is a water supply pipe 3 with a solenoid valve 403 on it. One end of the water supply pipe 3 is connected to a main water pipe for supplying water to the water spraying part 101, while the other end is in a sealed state to prevent water from flowing out from the other end of the water supply pipe 3. The solenoid valve 403 and the sensor 404 cooperate with each other. When the sensor 404 senses an opening of the sliding doors 4, the sensor 404 will transmit a signal to the solenoid valve 403. After the solenoid valve 403 is opened, the water supply pipe 3 will start supplying water to the water spraying part 101; the manner to open the water spraying part 101 can also be through a manual mechanical valve, which is installed on the wall connected to the water supply pipe 3. When it is necessary to open, the mechanical valve can be turned to start the water supply pipe 3 to supply water.

Please refer to FIGS. 3, 5, 6, and 7, an interior of the water spraying part 101 is a hollow pipeline structure, which is a square pipeline. There is also a water intake pipe 106 on a top surface of the water spraying part 101, and a bottom of the water intake pipe 106 is a threaded structure. The water intake pipe 106 rotates and is screwed onto the water spraying part 101. There are through holes corresponding to the position of the water intake pipe 106 on the fixed groove 104, top plate 102, heat insulation cotton 107, and water supply pipe 3.

The water intake pipe 106 can be sealed and connected to the through holes of the four, and the through holes of the fixed groove 104, top plate 102, heat insulation cotton 107, and water supply pipe 3 are aligned vertically. A blowhole 1011 is provided on both sides below the water spraying part 101, and the water inside the water spraying part 101 will spray out from the blowhole 1011. During installation, the water spraying part 101 will be inserted into the fixed groove 104. At this time, the water intake pipe 106 will pass through the through holes of the fixed groove 104, the top plate 102, and the heat insulation cotton 107 in sequence. Finally, it will pass through the through holes on the water supply pipe 3 to enter the interior of the water supply pipe 3. When the water supply pipe 3 is supplying water, the water in the water supply pipe 3 will enter the water spraying part 101 from the water intake pipe 106, and then spray outward from the blowhole 1011 onto the barrier curtain 2, achieving the effect of wetting the barrier curtain 2.

Please refer to FIG. 2, the barrier curtain 2 is a structure with an opening at the bottom and a hollow structure in the middle. The barrier curtain 2 can be folded as a whole and stored in the storage compartment 1. The outer layer 202 of the barrier curtain 2 is enclosed around the periphery of the water spraying part 101, and the inner layer 201 of the barrier curtain 2 is enclosed inside the water spraying part 101, so that the water spraying part 101 is between the inner layer 201 and the outer layer 202 of the barrier curtain 2. An area between the inner layer 201 and the outer layer 202 is a fire avoidance area 204. The water sprayed by the water spraying part 101 will flow from top to bottom in the fire avoidance area 204. The purpose of this design is that the water sprayed by the water spraying part 101 can simultaneously spray the fabric of the inner layer 201 and the outer layer 202. The fabric on the outer layer 202, due to direct contact with external flames, will cause the moisture on the outer layer 202 to quickly evaporate by the flames, while the water sprayed by the water spraying part 101 will continuously wet the outer layer 202 within the fire avoidance area 204, and due to the continuous downward flow of water in the fire avoidance area 204, it remains in a low temperature state to prevent high temperatures from entering the inner layer 201. At the same time, the wetted outer layer 202 can also block the entry of toxic smoke from the outside, achieving the effect of fire prevention and smoke avoidance. The center position of the inner layer 201 of the barrier curtain 2 is an isolation room 203, which is used to provide refuge space for the user.

When in use, the sliding doors 4 are opened by the pull handle 402, and the barrier curtain 2 will fall out of the storage compartment 1. The user will be in the isolation room 203 on the inner layer 201 of the barrier curtain 2. At the same time, the sensor 404 senses that the sliding doors 4 are opened, and it will send a signal to the solenoid valve 403. After the solenoid valve 403 is started, the water from the main water pipe will flow into the water intake pipe 106 through the water supply pipe 3, and the water in the water intake pipe 106 will enter the water spraying part 101. Then, it will spray out from the blowhole 1011 to the inner layer 201 and outer layer 202 of the barrier curtain 2. A second method is that after the barrier curtain 2 falls out, the user manually opens the mechanical valve, and then the water from the main water pipe will flow into the water intake pipe 106 through the water supply pipe 3, and then spray out from the blowhole 1011 onto the inner layer 201 and outer layer 202 of the barrier curtain 2.

Figure 8:
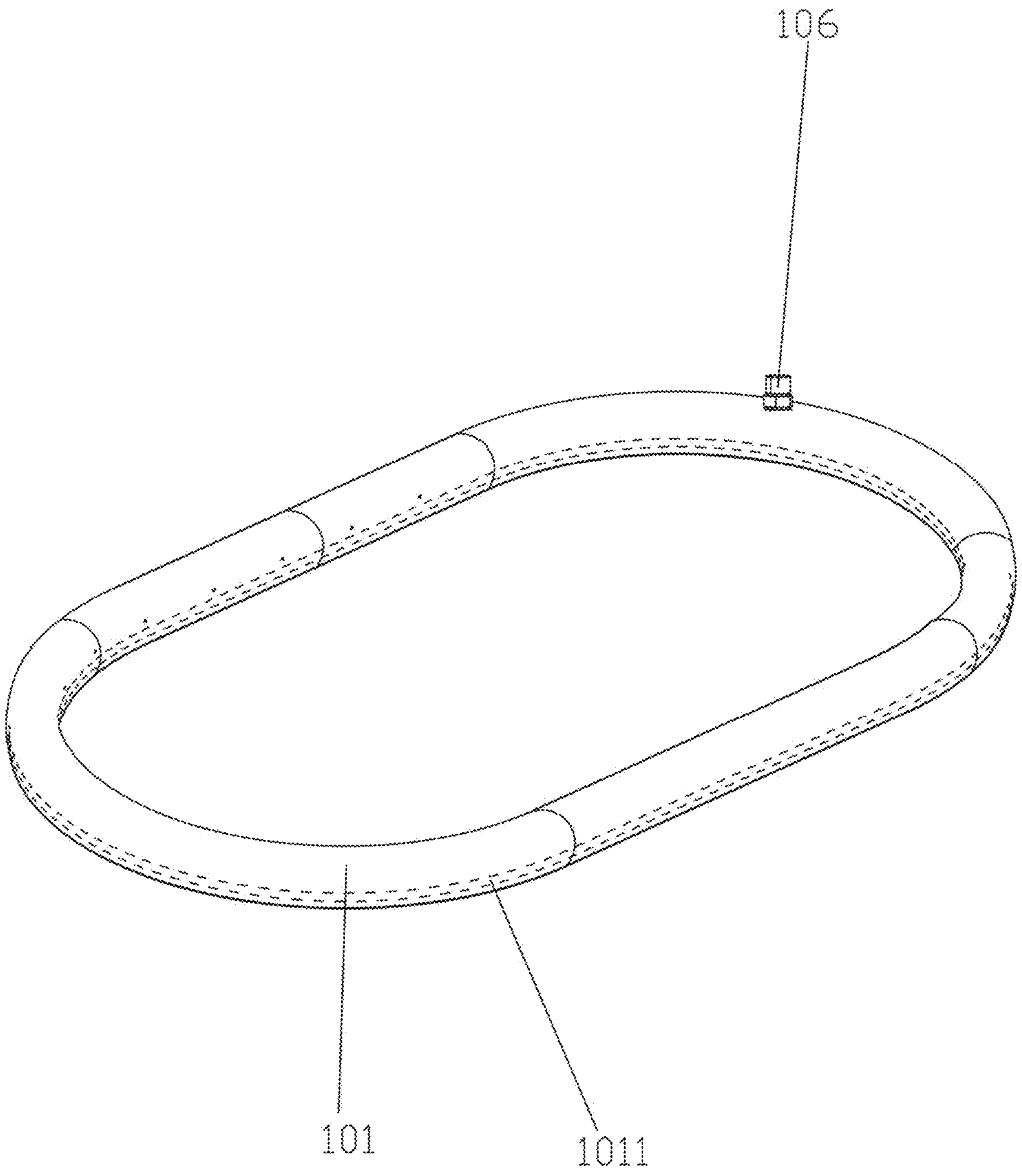
FIG. 8 is a structural schematic diagram of the water spraying part in Embodiment 2 of the present disclosure.

Embodiment 2: please refer to FIG. 8, the difference between Embodiment 2 and Embodiment 1 is that the hollow pipeline of the water spraying part 101 is a circular pipeline.

Figure 9:
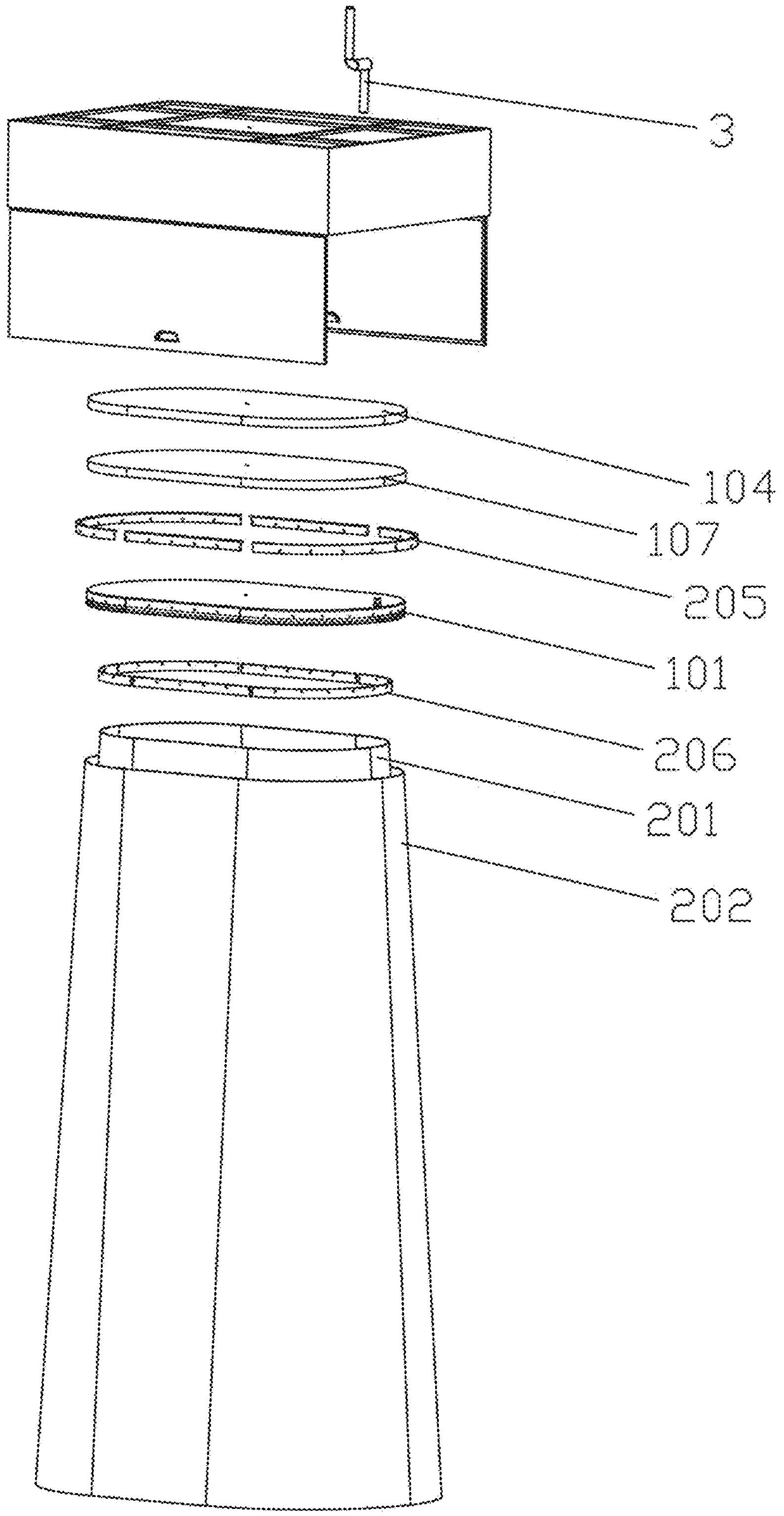
FIG. 9 is a three-dimensional schematic diagram of a decomposition structure of Embodiment 3 of the present disclosure.
Figure 10:
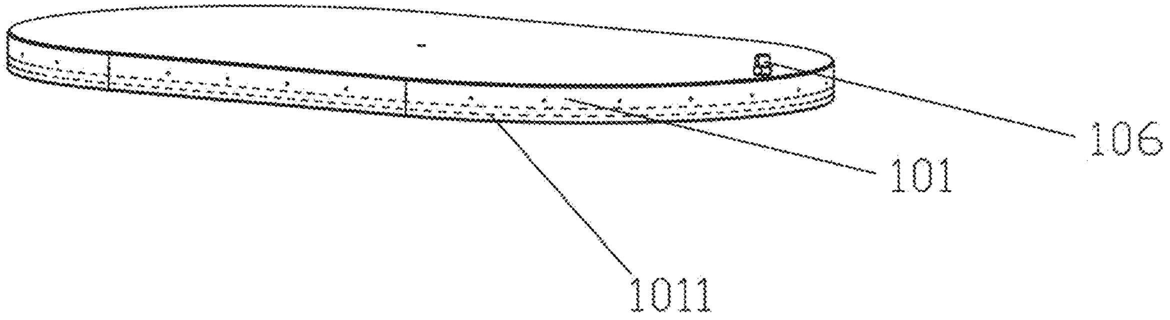
FIG. 10 is a structural schematic diagram of the water spraying part in Embodiment 3 of the present disclosure.

Embodiment 3, please refer to FIGS. 9 and 10, in Embodiment 3, the fixed groove 104 and the water spraying part 101 are a solid runway shaped structure in the middle. The center part of the fixed groove 104 and the water spraying part 101 are respectively provided with a through hole for passing through a screw. The top plate 102 is provided with a through hole that matches it, and the screw passes through the through hole from bottom to top, so that the fixed groove 104 and the water spraying part 101 are fixed together below the top plate 102. In this embodiment, the fixed groove 104 has the same function as the fixed groove 104 in Embodiment 1.

On the inner and outer side walls of the water spraying part 101, there are an inner installation strip 206 and an outer installation strip 205 respectively, which are used to install the barrier curtain 2.

The inner installation strip 206, the inner wall of the water spraying part 101, and the inner layer 201 of the barrier curtain 2 are respectively provided with a corresponding through hole for the screw to pass through. The inner layer 201 of the barrier curtain 2 is provided between the inner installation strip 206 and an inner wall of the water spraying part 101, and the screw passes through the corresponding through holes of the three to make them tightly fit and fixedly connected.

The outer installation strip 205, the outer wall of the water spraying part 101, and the outer layer 202 of the barrier curtain 2 are respectively provided with a corresponding through hole for the screw to pass through. The outer layer 202 of the barrier curtain 2 is provided between the outer installation strip 205 and an outer wall of the water spraying part 101, and the screw passes through the corresponding through holes of the three to render them to be tightly fit and fixed. In addition, a buckle can be installed on the inner side of the top plate 102 of the inner layer 201, and a miniature oxygen tank can be flexibly clamped on the buckle to provide sufficient oxygen when multiple people enter the isolation room 203 formed by the inner layer 201.

The above technical solutions have shown good results in actual testing.

The testing method is as follows:

1. Test conditions: a thermal conductivity coefficient of the barrier curtain is 0.02-0.045 W/mK, and a density value is 1200 kg/m$^3$; thermal conductivity of the building wall and ground layers is 0.9 W/mK, with a density of 2700 kg/m$^3$. The water flow rate is 0.5 L/s, the specific heat is 42000 J/kg° C., and the convective heat transfer coefficient is 1500 W/(m$^2$° C.). The external temperature of the barrier curtain is 1000° C.

2. Test method: providing with combustion devices on both sides of the periphery of the device for high-temperature continuous combustion.

3. Test results: the temperature outside the entire barrier curtain is very high (close to 1000° C.), mainly due to heat conduction and radiation during a fire. There is a large temperature gradient in an insulation layer, and the temperature drops directly from 1000° C. to below 100° C. It can be seen that the insulation ability of the barrier curtain (such as thickness and thermal conductivity) is an important factor in ensuring that the temperature in the shelter is below a specific value, which meets the normal survival and operation of personnel inside the shelter. Within 2 hours, the surface temperature inside the shelter is around 30° C., ensuring that the space in which personnel are located does not cause thermal damage to the human body due to thermal radiation and convection.

| Thickness of the barrier curtain (mm) | | | Top mounted (calculated time 1 h) (being tested in the isolation room) | |
|---|---|---|---|---|
| Outer layer | Inner layer | Thermal insulation cotton | With water cooling (double layer) | Without water cooling (single layer, made of the same material as the outer layer) |
| 0.6 | 0.36 | 8 | 38° C. | 169° C. |
| 0.7 | 0.62 | 10 | 36° C. | 158° C. |
| 0.8 | 0.98 | 12 | 35° C. | 150° C. |
| 0.9 | 1.08 | 14 | 33° C. | 139° C. |
| 1.0 | 1.23 | 16 | 31° C. | 128° C. |
| 1.1 | 1.35 | 18 | 30° C. | 110° C. |

Through testing data, it can be concluded that the technical solution of the present application, which introduces a double-layer structure and water-cooling technology, the self-rescue device has achieved an expected effect, the insulation efficiency can be further improved by using different thickness.

The above content is a further detailed explanation of the present disclosure based on specific preferred embodiments, and it cannot be assumed that the specific embodiments of the present disclosure is limited to these explanations. For those skilled in the field to which the present disclosure belongs, several simple deductions or replacements can be made without departing from the concept of the present disclosure, which should be considered as the protection scope of the present disclosure.

What is claimed is:

1. A fire emergency self-rescue device, wherein the fire emergency self-rescue device is provided with a storage compartment and a soft barrier curtain; the storage compartment is a frame structure with an opening facing downward;

a top of the storage compartment is provided on a ceiling of a bathroom, and the soft barrier curtain is provided in the storage compartment;

an upper of the soft barrier curtain is fixed on an inner side of a top of the frame structure of the storage compartment and is capable of being suspended from top to bottom to ground;

the soft barrier curtain is a double-layer structure; a top of an interior the storage compartment is provided with a water spraying part;

a water intake pipe of the water spraying part is connected to an indoor water supply system; inner and outer layers of the soft barrier curtain are respectively provided on inner and outer sides of the water spraying part, and the water spraying part is capable of spraying on the inner and outer sides of the soft barrier curtain so as to humidify and cool the soft barrier curtain;

wherein inner and outer sides of the water spraying part are respectively provided with an inner installation strip and an outer installation strip, and the inner installation strip and the outer installation strip are configured to fix the inner and outer layers of the soft barrier curtain on the water spraying part.

2. The fire emergency self-rescue device according to claim 1, wherein the storage compartment comprises a top plate and a surrounding edge, the top plate is fixed to the ceiling by a screw, the surrounding edge is provided around an inner side of the top plate, and the surrounding edge is fixedly connected to the top plate so as to form a frame structure.

3. The fire emergency self-rescue device according to claim 2, wherein the water spraying part is a hollow pipeline structure with a plurality of water spraying holes on two horizontal sides of the pipeline so as to humidify and cool the soft barrier curtain.

4. The fire emergency self-rescue device according to claim 3, wherein the water spraying part is a square pipeline structure.

5. The fire emergency self-rescue device according to claim 4, wherein a position of the opening of the storage compartment is provided with two sliding doors that are capable of being opened opposite to each other so as to store the soft barrier curtain.

6. The fire emergency self-rescue device according to claim 5, wherein an upper of the water spraying part is further provided with a layer of ceramic fiber cloth having a thickness of 10-20 mm.

7. The fire emergency self-rescue device according to claim 6, wherein a pull handle is provided on each sliding door in a downward direction so as to open the two sliding doors and cause the soft barrier curtain to fall; the water intake pipe is connected to the indoor water supply system through a valve.

8. The fire emergency self-rescue device according to claim 3, wherein the water spraying part is a circular pipeline structure.

9. The fire emergency self-rescue device according to claim 8, wherein a position of the opening of the storage compartment is provided with two sliding doors that are capable of being opened opposite to each other so as to store the soft barrier curtain.

10. The fire emergency self-rescue device according to claim 1, wherein the outer layer is a high silica cloth with a thickness of 0.6-1.2 mm, and the inner layer is a high silica cloth coated with a silicone adhesive layer with a thickness of 0.4-1.3 mm.

* * * * *